United States Patent
Holmes et al.

(10) Patent No.: US 9,070,099 B2
(45) Date of Patent: Jun. 30, 2015

(54) DEVELOPING AND EXECUTING WORKFLOW PROCESSES ASSOCIATED WITH DATA-ENCODED TAGS

(75) Inventors: David Holmes, La Center, WA (US); Mathew Smith, Antibes (FR); Joseph Tassone, Bedford, MA (US)

(73) Assignee: Identive Group, Inc., Santa Ana, CA (US)

( * ) Notice: Subject to any disclaimer, the term of this patent is extended or adjusted under 35 U.S.C. 154(b) by 397 days.

(21) Appl. No.: 13/327,824

(22) Filed: Dec. 16, 2011

(65) Prior Publication Data

US 2013/0154800 A1    Jun. 20, 2013

(51) Int. Cl.
G08B 21/00    (2006.01)
G06Q 10/06    (2012.01)
G06Q 10/08    (2012.01)

(52) U.S. Cl.
CPC ...... G06Q 10/06312 (2013.01); G06Q 10/0633 (2013.01); G06Q 10/0833 (2013.01)

(58) Field of Classification Search
USPC .......................... 235/375; 701/300; 718/100
See application file for complete search history.

(56) References Cited

U.S. PATENT DOCUMENTS

| | | | |
|---|---|---|---|
| 6,294,997 B1 * | 9/2001 | Paratore et al. | 340/572.1 |
| 6,336,137 B1 | 1/2002 | Lee et al. | |
| 8,060,627 B2 | 11/2011 | Rosenblatt et al. | |
| 2004/0143597 A1 | 7/2004 | Benson et al. | |
| 2007/0124077 A1 | 5/2007 | Hedlund, Jr. | |
| 2008/0113614 A1 | 5/2008 | Rosenblatt | |
| 2009/0061901 A1 | 3/2009 | Arrasvuori et al. | |
| 2009/0100428 A1 | 4/2009 | Willner et al. | |
| 2010/0066497 A1 * | 3/2010 | Lim et al. | 340/10.1 |
| 2011/0140857 A1 * | 6/2011 | Hull et al. | 340/10.1 |
| 2011/0225069 A1 | 9/2011 | Cramer et al. | |
| 2011/0284635 A1 | 11/2011 | Lapstun et al. | |

FOREIGN PATENT DOCUMENTS

| | | |
|---|---|---|
| GB | 2 458 388 | 9/2009 |
| WO | 2009094724 | 8/2009 |

OTHER PUBLICATIONS (C2) International Search Report and Written Opinion from corresponding PCT patent application PCT/US2012/61933, dated Jun. 3, 2013, 15 pages.

International Search Report and Written Opinion from co-pending PCT patent application No. PCT/US2012/061934, dated Feb. 26, 2013, 10 pages.

* cited by examiner

Primary Examiner — Mark Rushing
(74) Attorney, Agent, or Firm — Proskauer Rose LLP (57) ABSTRACT

Methods and apparatuses, including computer program products, are described for developing workflow processes associated with data-encoded tags. A server receives tag data associated with each of a plurality of data-encoded tags from one or more mobile devices capable of reading data-encoded tags. The server generates a collection of tags to include each of the plurality of data-encoded tags. The server develops a workflow process associated with the collection of tags using the received tag data, and stores the workflow process in a data storage module.

25 Claims, 5 Drawing Sheets

DEVELOPING AND EXECUTING WORKFLOW PROCESSES ASSOCIATED WITH DATA-ENCODED TAGS

FIELD OF THE INVENTION

The subject matter of this application relates generally to methods and apparatuses, including computer program products, for developing and executing workflow processes associated with data-encoded tags.

BACKGROUND OF THE INVENTION

Use of data-encoded tags to store and make available information about a related item has become increasingly common. Tags utilize different types of communication and encoding standards, such as radio frequency identification (RFID), near-field communication (NFC), two-dimensional (2D) bar code, or quick response (QR) code, among others. Portable wireless devices, such as smartphones and tablets, are able to read the tags and collect the information stored on the tags. As an example, for NFC tags, the NFC forum has defined the NFC Data Exchange Format (NDEF) to standardize the storage of data on an NFC tag.

The typical use of such tags is to encode a static data item on the tag that acts as a pointer or an instruction to a wireless device that reads the tag. For example, the data item can instruct the device to visit a web site, receive content, or make a phone call to a particular number. Typically, tag management systems associate tag data to static content related to physical locations or points of interest (e.g., the location where the tag is affixed) or static pointers to variable content, such as news and data web sites or public transportation schedules.

As mobile technology becomes more sophisticated, there is a need for more advanced use and management of tags. Demanding applications and complex use cases such as integration with social networks, location-based marketing and enterprise applications require logic process and workflow handling beyond simply reading static data encoded onto tags.

Therefore, systems and methods are required to provide a dynamic connection to a workflow-based content delivery and fulfillment system that integrates tags, wireless device software, and network server with content management, workflow capabilities and integration with third party content or service fulfillment.

SUMMARY OF THE INVENTION

In general overview, the techniques described herein are related to developing and executing workflow processes associated with data-encoded tags. The techniques provide for dynamic creation and management of workflows that are connected to one or more data-encoded tags, where a wireless device interacts with a server-based system to generate and execute workflow processes for a variety of applications, based on the device's interaction with the tags.

A collection of tags is created through a process of reading a tag and recording the tag's location and data associated with the tag. For example, multiple users on different mobile devices that use an application are able to record many tags in parallel by using the techniques described herein. Once assembled, the collection of tags can be linked into a workflow process. This is done by way of defining a role for each tag, which can be done in batches selected by multiple different criteria, for example, proximity to a point of interest, or date of recording the tag. A process is defined in a server-based workflow system and transitions between the workflow steps are defined according to the role of the tag and decisions based on associated tag data. This may include a multiplicity of data such as, the history of previous tags, the time of the reading, the location of the tag, the user profile and the handset characteristics, or other external data items or sources.

The dynamically generated content or fulfillment service associated with the next step of the process flow is executed and the end user receives the appropriate content or service. In addition data or content may be requested from the user and this may be transmitted to the server for recording or incorporation into further steps of the process and hence become criteria for further decisions.

The invention, in one aspect, features a system for developing workflow processes associated with data-encoded tags. The system includes a server configured to receive, from one or more mobile devices capable of reading data-encoded tags, tag data associated with each of a plurality of tags and generate a collection of tags to include each of the plurality of data-encoded tags. The server is also configured to develop a workflow process associated with the collection of tags using the tag data, and store the workflow process in a data storage module.

The invention, in another aspect, features a system for content and workflow process management for mobile devices through use of data-encoded tags. The system includes a server configured to receive, from one or more mobile devices capable of reading data-encoded tags, tag data associated with each of a plurality of tags, determine a workflow process using the tag data, and transmit, to the one or more mobile devices, content associated with the workflow process.

The invention, in another aspect, features a method for developing workflow processes associated with data-encoded tags. The method includes receiving, by a server from one or more mobile devices capable of reading data-encoded tags, tag data associated with each of a plurality of data-encoded tags and generating, by the server, a collection of tags to include each of the plurality of data-encoded tags. The method also includes developing, by the server, a workflow process associated with the collection of tags using the received tag data, and storing, by the server, the workflow process in a data storage module.

The invention, in another aspect, features a method for content and workflow process management for mobile devices through use of data-encoded tags. The method includes receiving, by a server from one or more mobile devices capable of reading data-encoded tags, tag data associated with each of a plurality of data-encoded tags, determining, by the server, a workflow process using the received tag data, and transmitting, to the one or more mobile devices, content associated with the workflow process.

The invention, in another aspect, features a computer program product, tangibly embodied in a non-transitory computer readable storage medium, for developing workflow processes associated with data-encoded tags. The computer program product includes instructions operable to cause a data processing apparatus to receive, from one or more mobile devices capable of reading data-encoded tags, tag data associated with each of a plurality of data-encoded tags, and generate a collection of tags to include each of the plurality of data-encoded tags. The computer program product also includes instructions operable to cause a data processing apparatus to develop a workflow process associated with the collection of tags using the received tag data, and store the workflow process in a data storage module.

The invention, in another aspect, features a computer program product, tangibly embodied in a non-transitory computer readable storage medium, for content and workflow process management for mobile devices through use of data-encoded tags. The computer program product includes instructions operable to cause a data processing apparatus to receive, from one or more mobile devices capable of reading data-encoded tags, tag data associated with each of a plurality of data-encoded tags, determine a workflow process using the received tag data, and transmit, to the one or more mobile devices, content associated with the workflow process.

In some embodiments, any of the above aspects can include one or more of the following features. In some embodiments, the plurality of data-encoded tags are distributed at different locations. In some embodiments, the plurality of data-encoded tags include RFID tags, NFC tags, smart cards, 2D barcode tags, QR code tags, or any combination thereof.

In some embodiments, the data associated with each tag includes location of the tag, color of the tag, design of the tag, affixed position of the tag, points of interest in proximity to the tag, tag type, memory size, tag owner, collection or collection sub-set, security level, information about the affixed position, information about object(s) the tag is affixed to, or any combination thereof. In some embodiments, the one or more mobile devices records the data associated with each tag in the form of audio, still pictures, video, text, numbers, or any combination thereof.

In some embodiments, the server receives the tag data from the one or more devices as each tag is read. In some embodiments, the server receives the tag data from the one or more devices using a batch process. In some embodiments, generating a collection of tags includes determining the identity of a collection of tags to be used, and associating each of the plurality of data-encoded tags and corresponding tag data with the determined collection of tags. In some embodiments, the identity of the collection of tags is determined via user input. In some embodiments, the identity of the collection of tags is determined via a common characteristic of the data collected from the collection of tags.

In some embodiments, the one or more mobile devices store the recorded tag data in a local data storage module before the server receives the recorded tag data. In some embodiments, the server is configured to define a role for each of the plurality of data-encoded tags based on the tag data, and develop the workflow process based on the defined role for each tag. In some embodiments, the server is configured to receive, from the one or more mobile devices, user data associated with a user of the mobile device. In some embodiments, the workflow process is developed using the user data.

In some embodiments, determining a workflow process includes retrieving, from a data source, additional tag data based on the received tag data, generating an instance of a predefined workflow process based on the received tag data, the workflow process comprising a plurality of process steps, identifying a first process step in the instance based on the received tag data and the additional tag data, setting a state of the instance to the first process step, executing one or more actions based on the identified process step, transmitting content to the one or more mobile devices, the content being associated with the identified process step and based on the executed actions, and updating the state of the instance to a second process step upon receiving an indication from the one or more mobile devices that the transmitted content has been completed. In some embodiments, executing one or more actions based on the identified process step includes evaluating at least one of: a tag read time, a tag location, a position of the first process step within the workflow process, transitions from the first process step, decision rules associated with the first process step, a sequence of tags read by the one or more mobile devices, a user associated with one or more of the mobile devices, context data associated with the first process step, or any combination thereof.

In some embodiments, executing one or more actions based on the identified process step further comprises at least one of interacting with a third-party server to obtain data from an external data source, sending data to an external system, and updating an external system in terms of status messages, context data or other associated data. In some embodiments, the transmitted content includes a request for the mobile device to perform an action and the indication is generated upon the mobile device performing the requested action.

In some embodiments, the request for the mobile device to perform an action includes a request to answer on-screen prompts, a request to input data based on local observation, a request to capture audiovisual media, a request to interact with another remote device, or any combination thereof. In some embodiments, the server is configured to transmit at least a portion of the determined workflow process to the one or more mobile devices to enable the devices to execute the workflow process while disconnected from the server and, upon reconnection of the devices to the server, receive, from the devices, activity data associated with the workflow process. In some embodiments, a plurality of instances of one or more predefine workflow processes are generated based on the recorded tag data, wherein each of the plurality of instances is unique to a user of one of the mobile devices.

In some embodiments, the system includes a plurality of data-encoded tags. In some embodiments, the system includes one or more mobile devices capable of reading data-encoded tags. In some embodiments, the server is configured to receive, from the one or more mobile devices, user data associated with a user of the mobile device. In some embodiments, the workflow process is developed using the user data.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

The systems, methods and devices described herein are directed to the creation and management of arbitrary geospatial workflow processes mediated by enabled mobile devices reading and writing to data-encoded tags, together with network-connected server and associated fulfillment services.

For example, a workflow process including a survey of physical locations can be designed and dispatched from a server-based system to a surveyor using a mobile device. The surveyor is guided through the survey via the mobile device to collect and record data, such as text, numerical data, audio and video and using data encoded into tags as triggers for the current and future steps in the survey. The surveyor receives instructions and historical data regarding the physical locations associated with the tags as part of the process.

Another example is a consumer using a mobile device to enter a retail environment and read a tag. The system generates content to be sent to the device based on certain data and events, including but not limited to the previous tags that the user has read and that have been stored in the database, the preferences expressed by the user and stored in a profile of the user, other events such as tags read by other consumers either related or unrelated to the first consumer. Other events or decisions such as selection by a third party selection process, or a set of criteria based on general market data such as shopping history, search history or other criteria may be used.

Figure 1:
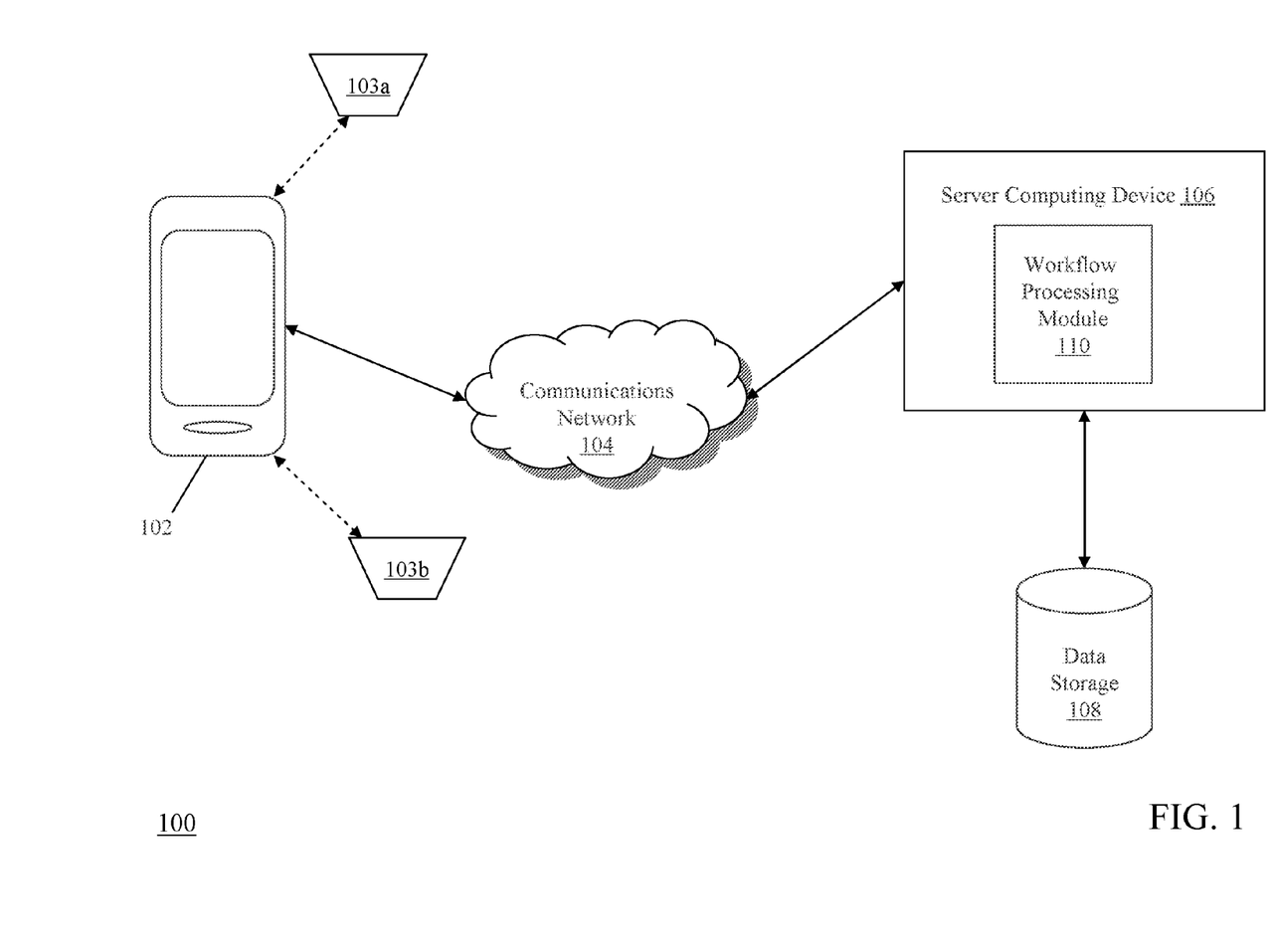
FIG. 1 is a block diagram of a system for developing and executing workflow processes associated with data-encoded tags.

FIG. 1 is a block diagram of a system 100 for developing workflow processes associated with data-encoded tags. The system 100 includes a mobile computing device 102, data-encoded tags 103a-b, a communications network 104, a server computing device 106, and a data storage device 108. The server 106 and the data storage device 108 can reside at the same physical location or may be dispersed to different physical locations. The server 106 and the data storage device 108 can be located on the same physical device, or the data storage device 108 can be distributed on a different physical device. The server 106 and the data storage device 108 can communicate via a communications network, for example the communications network 104. Although FIG. 1 depicts only a single mobile computing device 102, two data-encoded tags 103a-b, a single communications network 104, a single server computing device 106, and a single data storage device 108, the techniques described herein are not limited to this structure. Instead, this system 100 can include any of a number of configurations or components (e.g., multiple mobile computing devices, multiple tags, multiple servers) that do not depart from the scope and spirit of the invention.

The mobile computing device 102 communicates with the server computing device via the communications network 104. Example mobile computing devices 102 can include, but are not limited to a smart phone (e.g., Apple iPhone®, BlackBerry®, Android™-based device) or other mobile communications device, a tablet computer, an internet appliance, a personal computer, or the like. In some examples, the mobile device 102 can be installed in a vehicle. The mobile device 102 can be configured to include an embedded digital camera apparatus, and a storage module (e.g., Flash memory) to hold photographs, video or other information captured with the camera. The mobile device 102 includes network-interface components to enable the user to connect to a communications network 104, such as the Internet, wireless network (e.g., GPRS, CDMA, RF), or the like. The mobile device can also include components (e.g., scanner, reader) to enable the device to communicate electronically with tags (e.g., tags 103a-b) in proximity to the device, and to read tags such as barcodes or QR codes.

The mobile device 102 reads the data-encoded tags 103a-b to obtain information from the tags 103a-b. The data-encoded tags 103a-b can be a type of electronic tag that communicates with the mobile device 102 via a wireless standard (e.g., RFID, NFC) or a printed tag (e.g., barcode, QR code) that the mobile device 102 can scan, for example, via image capture. In some embodiments, at least some of the tags 103a-b are smart cards. The tags 103a-b can be distributed at the same physical location, or distributed at different locations (e.g., within a building or geographic area).

The communications network 104 channels communications from the mobile device 102 to the server 106. The network 104 may be a local network, such as a LAN, or a wide area network, such as the Internet or the World Wide Web. The network 104 may utilize cellular, satellite or other wireless communications technology. For example, the mobile device 102 may send and receive information via a communications link to a satellite, which in turn communicates with the server 106. The mobile device 102 and the server 106 can transmit data using standard formatting and/or transmission protocols, such as XML, HTTP, HTTPS, SMS, JSON, or other similar data communication techniques.

The server computing device 106 communicates with the mobile device 102 via a communications network, e.g., communications network 104. The server 106 includes a workflow processing module 110. The workflow processing module 110 provides a data interface between the mobile device 102 and the server 106.

Figure 2:
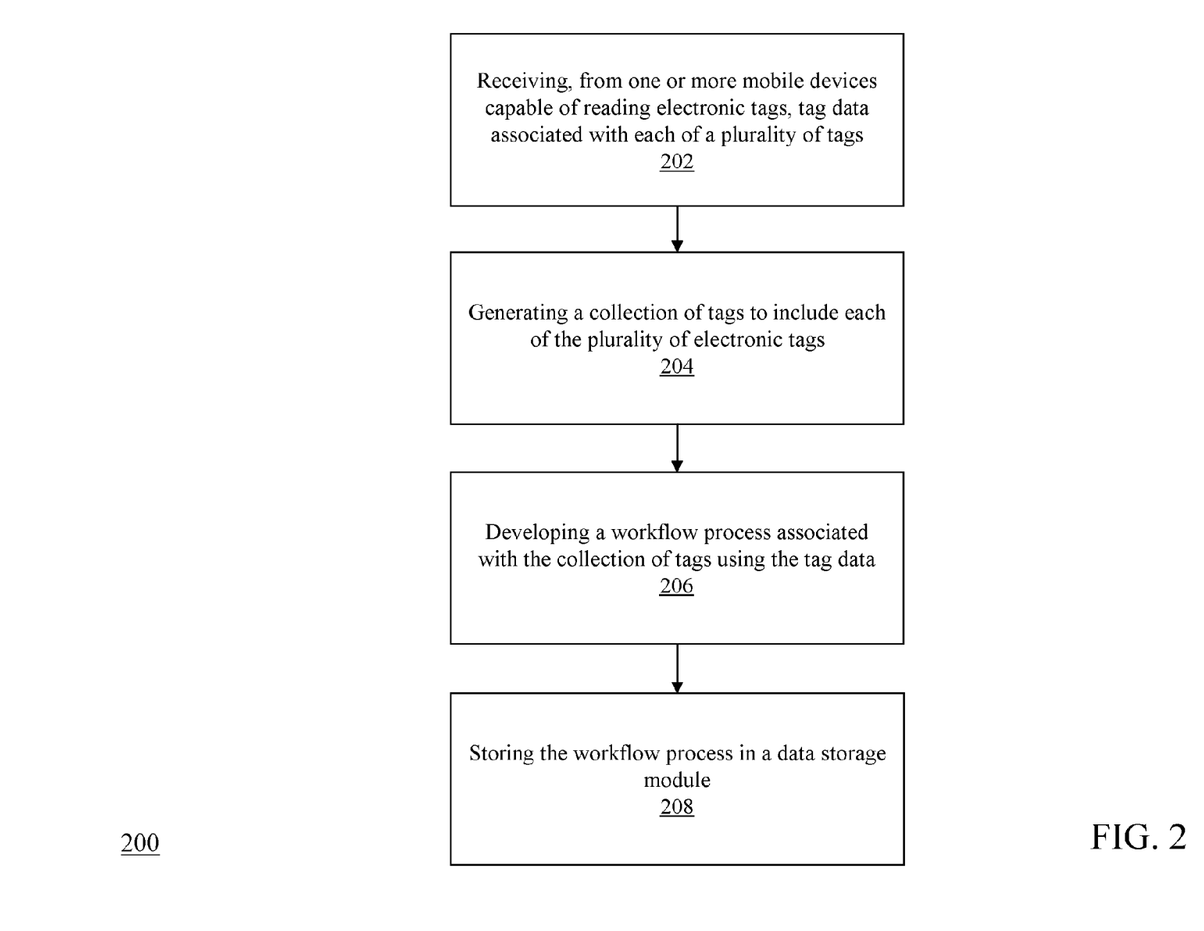
FIG. 2 is a flow diagram of a method for developing workflow processes associated with data-encoded tags.

FIG. 2 is a flow diagram 200 of a method for developing workflow processes associated with data-encoded tags using the system 100 of FIG. 1. The workflow processing module 110 of the server computing device 106 receives (202) tag data associated with each of a plurality of tags (e.g., tags 103a-b) from one or more mobile devices (e.g., mobile device 102) capable of reading the tags. The workflow processing module 110 generates (204) a collection of tags to include each of the plurality of tags identified by the received tag data. The workflow processing module 110 develops (206) a workflow process associated with the collection of tags by using the received tag data. The workflow processing module 110 stores the developed workflow process in a data storage module (e.g., data storage 108).

In some embodiments, the plurality of tags 103a-b are encoded with data during manufacture and are distributed in a geographically dispersed manner. In some embodiments, the plurality of tags 103a-b are encoded with data on location. For each tag, the mobile device can:

Read data encoded in the tag, including but not limited to an identification parameter that uniquely identifies the tag to the system;

Associate the tag and its encoded data with a collection of tags (which are optionally selectable by the user);

Capture and record the location (via GPS or other geo-positioning capability of the mobile device) of the tag; and Record additional data associated with the tag such as color of the tag, design of the tag, affixed position of the tag, and points of interest in proximity to the tag. The additional data can be recorded in the form of audio, still pictures, video, text, and/or numbers.

Once the workflow processing module 110 in the server computing device 106 collects the tag data from the mobile device 102 and stores the collection of tags, the workflow processing module can use the collection of tags to develop workflow processes associated with the tags. In some embodiments, the workflow processing module defines sub-sets of one or more collections of tags. A sub-set of a collection of tags can be associated with an individual workflow process, where a particular tag can have a different role depending on various factors, such as the user or mobile device that reads the tag and/or other characteristics of the context in which the tag was read.

Figure 3:
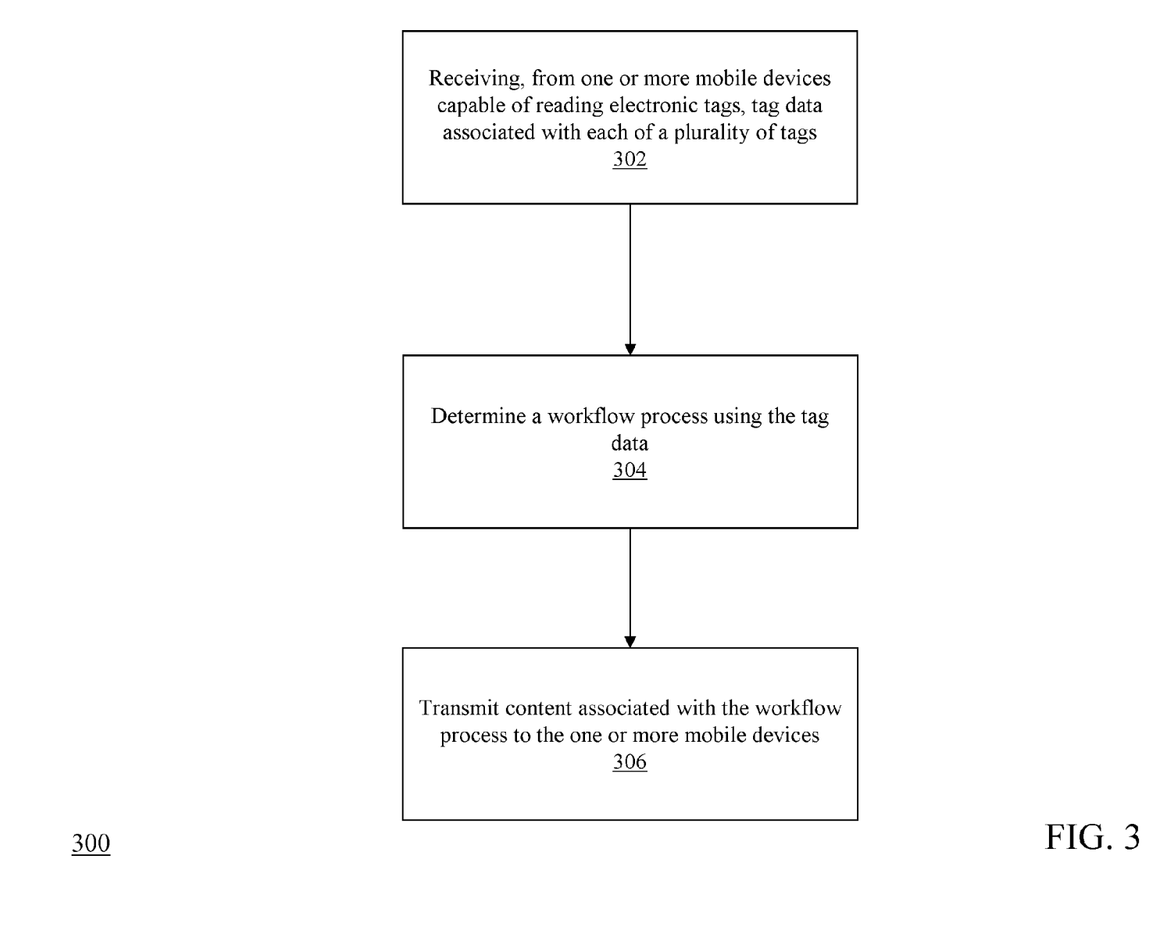
FIG. 3 is a flow diagram of a method for executing workflow processes associated with data-encoded tags.

FIG. 3 is a flow diagram 300 of a method for executing workflow processes associated with data-encoded tags using the system 100 of FIG. 1. The workflow process module 110 of the server computing device 106 receives (302) tag data associated with each of a plurality of tags (e.g., tags 103a-b) from one or more mobile devices (e.g., mobile device 102) capable of reading data-encoded tags. The workflow process module 110 determines (304) a workflow process using the tag data. The workflow process module 110 transmits (306) content associated with the workflow process to the one or more mobile devices.

Figure 4:
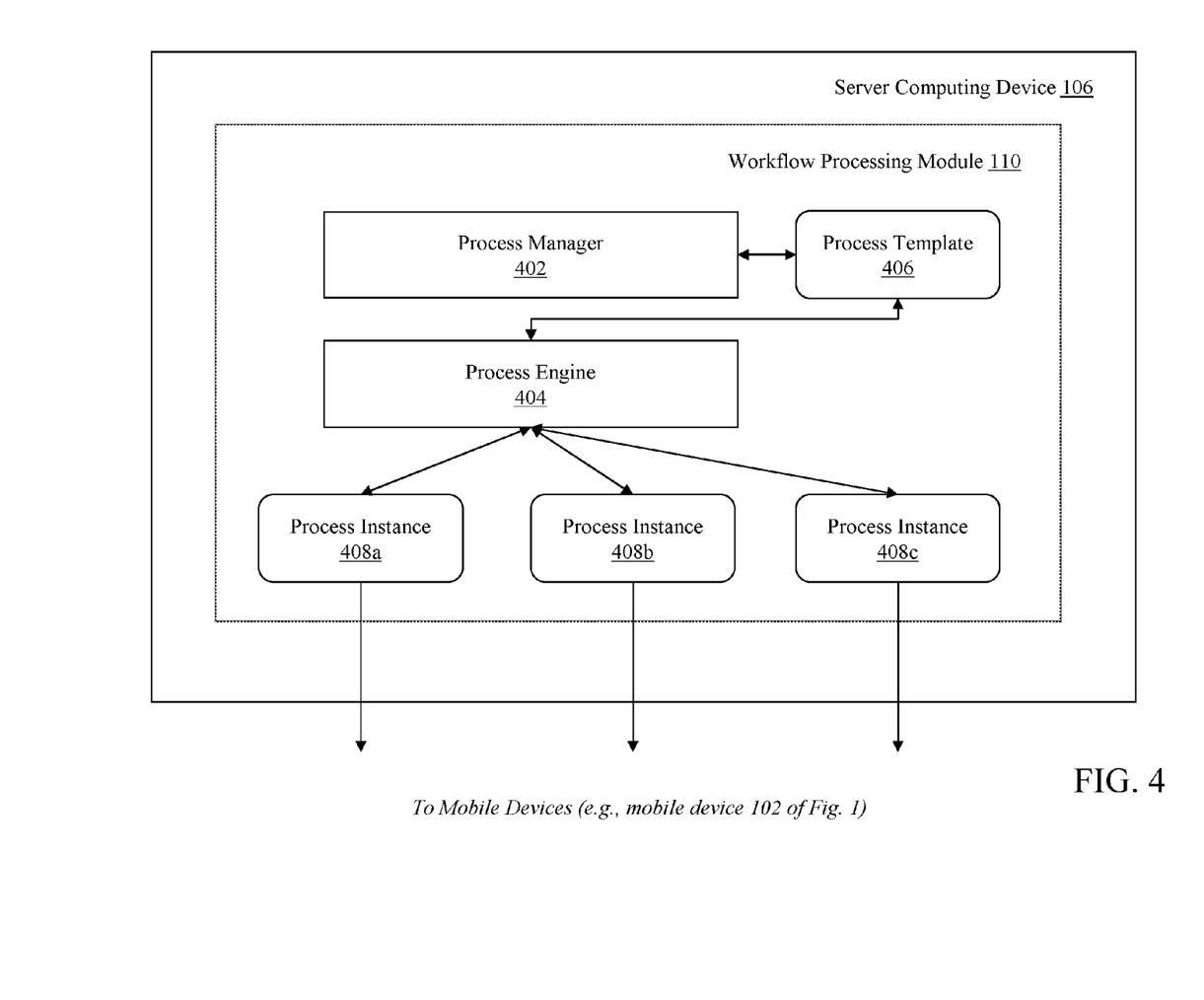
FIG. 4 is a detailed block diagram of the workflow processing module.

FIG. 4 is a detailed block diagram of the workflow processing module 110. The workflow processing module 110 includes a process template 402, a process manager 404, a process engine 406 and one or more process instances (e.g., 408a-c). The process template 402 is a series of process steps in the form of a workflow that can be pre-configured and stored for retrieval and access by the process manager 404 and process engine 406. Although FIG. 4 only depicts one process template 402, it should be understood that multiple process templates that define the same, similar or different workflow processes are available to be used by the process manager 404 and the process engine 406.

The process manager 404 controls the structure and design of the process template 402. For example, the process manager 404 can update the process template 402 by adding data requirements to impact the sequence of the process template 402 or changing business logic and rules associated with the process template 402. The process manager 404 can also develop derivative workflow processes from the process template 402. For example, the process manager 404 can extract a portion or sub-set of the process template 402 to provide a customized workflow to a mobile device based on specific requirements or tasks. In some embodiments, the process manager 404 is a software module executing on a processor located in the server computing device 106.

In some embodiments, the process template 402 is stored in a data storage module (e.g., data storage 108 of FIG. 1). The process manager 404 retrieves the process template 402 when updates are necessary, and the process engine 406 retrieves the process template when generating the process instances 108a-c for particular mobile devices that connect to the server computing device 106.

The process engine 406 retrieves the process template 402 and generates one or more process instances (e.g., 408a-c) of the process template 402 to be used by mobile devices. In some embodiments, the process engine 406 generates and manages a process instance for each mobile device that connects to the server computing device 106 and transmits tag data to the server 106. In some embodiments, the process engine 406 can generate and manage multiple process instances, where the multiple process instances are associated with a single mobile device or a plurality of mobile devices.

The process instances 408a-c are individual copies of the process template 402 that are generated by the process engine 406. The process instances 408a-c can be separate threads or sessions executing on the server computing device 106 that are associated with particular mobile device(s). The workflow processing module 110 can generate and execute a plurality of process instances at the same time to manage workflow processes for multiple mobile devices and/or users. In some embodiments, the process engine 406 generates a process instance (e.g., instance 408a) upon receiving tag data from a mobile device. The process engine 406 analyzes the tag data to determine a workflow process or processes to which the tag data applies, and generates an instance of the determined workflow process for use by the mobile device.

Figure 5:
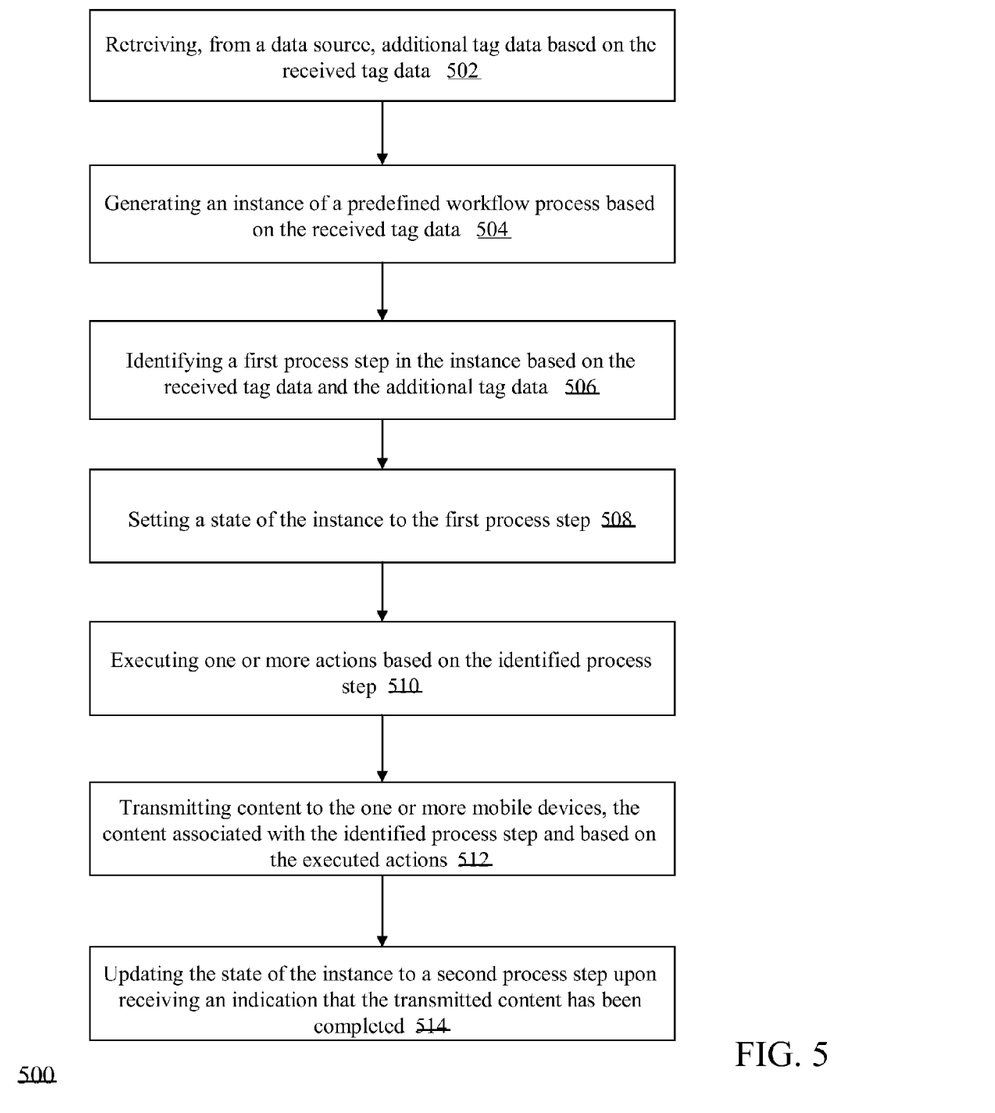
FIG. 5 is a flow diagram of a method for determining a workflow process associated with data-encoded tags.

FIG. 5 is a flow diagram of a method 500 for determining a workflow process based on received tag data (e.g., step 304 of FIG. 3) using the system 100 of FIG. 1 and the workflow processing module 110 of FIG. 4. The workflow processing module 110 receives tag data from a mobile device and retrieves (502) additional tag data from a data source coupled to the server computing device 106. The process engine 406 generates (504) an instance of a predefined workflow process (e.g., instance 408a) based on the tag data. The process engine 406 identifies (506) a process step in the generated process instance 408a based on the tag data.

The process engine 406 sets (508) a state of the generated process instance 408a to align with the identified process step and executes (510) one or more actions based on the identified process step. For example, if the received tag data indicates that the mobile device 102 which sent the tag data is performing a task associated with step three of a seven-step workflow process, the process engine 406 sets the generated process instance 408a to step three. As a result, when the process engine 406 receives subsequent tag data or action item responses from the mobile device 102, the process engine 406 understands at which point in the workflow the mobile device 102 is set (e.g., step three) and can execute actions related to later steps in the workflow process. Continuing with the above example, the process engine 406 can perform specific processing (e.g., related to the tag data) defined at step three of the workflow process and transmit (512) content to the mobile device 102 based on the processing. Upon transmitting the content and/or receiving a response to the transmitted content from the mobile device 102, the process engine 406 can update (514) the process instance 408a to a subsequent step (e.g., step four).

Further details of embodiments of the method for determining a workflow process based on received tag data are presented below. In some embodiments, the mobile device 102 reads a tag 103a and receives data that is encoded on the tag 103a. The encoded data can be a parameter or code (e.g., an ID number) that uniquely identifies tag 103a. The mobile device 102 can be configured to use the unique parameter to connect, via the network 104, to the server computing device 106 associated with the workflow processing module 110 and process engine 406. For example, tags 103a-b can be encoded with a uniform resource locator (URL) or other addressing parameter during manufacture. The tags 103a-b can also be encoded in a manner that encrypts the data located on the tags. Additionally, the unique parameter or tag ID—along with other characteristics or data associated with the tag—can be stored in a database (e.g., data storage 108) that is accessible by the server computing device 106. In some embodiments, the database that stores the tag ID is not accessible by the mobile device 102 directly.

As part of the connection process, the mobile device 102 transmits tag data. The process engine 406 can identify certain data items in the tag data, including but not limited to:
 characteristics of the participant (or user of the mobile device);
 the unique parameter (tag ID) that identifies the tag; and
 other data encoded on the tag.

The process engine 406 determines additional attributes or characteristics of the tag 103a by analyzing a data source (e.g., data storage 108) that contains tag data. For example, the process engine 406 can retrieve the tag location, tag owner, current role, and similar tag data.

The process engine 406 identifies the tag and user combination in order to determine the workflow process to use as a basis for generating a new process instance or, in cases where the process engine 406 has already associated a process instance (e.g., process instance 408a) with the tag and user combination, the process engine 406 identifies the tag and user combination to locate the process instance 408a in use by the mobile device 102 that transmitted the tag data. Based on the process instance currently in use by the mobile device 102, the process engine 406 executes actions (e.g., processing data, retrieving content) that are associated with the specific step of the process instance 408a. The process engine 406 then transmits content to the mobile device 102 based on the executed actions to complete the currently active step of the workflow process defined in the process instance 408a. The process engine 406 concurrently updates the process instance 408a to reflect the completion of the executed actions and transmitted content by, for example, moving to a subsequent process step or ending the process.

As described above, content, actions and service fulfillment that the server computing device 106, through the workflow processing module 110, delivers to the mobile device 102 are based on a workflow process model and process step transitions that depend on data derived from the mobile device's 102 reading of tag(s). In some embodiments, the process engine 406 performs a dynamic real-time evaluation of received tag data to determine the required actions in the associated workflow process. The evaluation can be based on a number of factors, including but not limited to:

the position, state or step in which the mobile device is currently active;
the topology of the process flow(s) within the overall workflow process, the transition between workflow process steps, and decision criteria associated with one or more transitions;
the decision points, logic, or business rules at each position, state or step of the process which the process engine can execute or consider;
the physical location of the tag, including the tag's proximity to and/or dependence on other tags of the system;
the time at which the mobile device read the tag;
the sequence and history of tags in the collection that the process engine has received from the mobile device;
the identity of the user operating the mobile device or an associated profile of the user—for example, the profile can include demographic and/or user preference data (that can be related to the user's previous or predicted behavior), and the data that constitutes the user profile can be provided by the user and/or derived by automated analysis of historical data stored in the system.

Further, the evaluation can be based on additional contextual aspects associated with the tag data, including but not limited to:

actions received in real-time from other mobile devices that are accessing the system;
events external to the system that influence the decision-making process of the process engine;
change in indicators relating to the business context of the system, for example, stock market indices;
weather forecasts;
public service announcements; and
flight or travel information.

Additionally, in some embodiments, the evaluation and execution of a workflow process by the process engine 406 can involve interaction with a third-party server or data source to:

gather information to be forwarded to the third-party;
obtain information from a third-party and forward that information to the mobile device;
determine the result of a decision in the workflow process and forward the result to the mobile device.

Further, in some embodiments, the process engine 406 transmits content to the mobile device based on the evaluation and execution of the workflow process. For example, the transmitted content can be a request to perform an action, including but not limited to:

answer on-screen prompts provided by the process engine;
input data based on a local observation made by a user of the mobile device at the location of the tag; and
take a picture or other audio/video recording with the device and transmit the picture to the process engine.

Another example of a request to perform an action is instructing the mobile device to interact with another NFC-enabled device (e.g., mobile device and/or tag). In this embodiment, multiple end users can interact within the same workflow process or across multiple workflow processes. In addition, different mobile devices can in one or many process instances during use of the system. At a particular point in time, the mobile devices can be interacting with multiple process instances—which can be related or unrelated, as the process instances can refer to different scenarios, workflows, tag collections, and/or tag collection owners.

In some cases, the user may want or need to work in an off-line mode, where the mobile device 102 is not presently connected to the server computing device 106 (e.g., via network 104). Therefore, in some embodiments, the workflow processing module 110 transmits workflow process data, including but not limited to process instance 408a steps, to the mobile device 102 for local storage and execution. For example, a set of data relating to the user, one or more workflow processess, and content relating to the workflow processes and the tag collection are loaded on to the mobile device prior to the device being disconnected from a wireless or fixed network connection. The mobile device 102 can continue to instantiate process instances so that the user can execute the workflows, and interact with tags and other devices, as if the user was online, but without the need to use the network 104 to connect to the server computing device 106 for a pre-determined amount of time.

When the mobile device 102 reconnects to the server computing device 106, the server computing device 106 receives the tag and activity data generated during the time that the mobile device were off-line. In some embodiments, the received data can notify the server computing device 106 of the user's progress through the workflow process during the off-line time.

In some embodiments, the off-line mode is initiated on-demand. For example, when there is a sudden loss of network connection or network signal, the off-line mode can be supported by a cache of future possible states or steps within the workflow process. The cache can be computed ahead of time by the server computing device 106 according to various outcomes or scenarios that can occur. The server computing device 106 updates the cache on the mobile device 102 with content for a limited future duration, either based on a length of time or a number of steps in the workflow.

In some embodiments, the off-line mode is initiated in a planned way. When the off-line mode is initiated in a planned way, the user (or another separate user or users) can predefine a workflow through a preset collection of tags. The process instance of the predefined workflow is generated on-line in connection with the server computing device 106. Once the instance is generated, the server computing device 106 compiles the process instance and the related content, and transfers the compiled data to the mobile device 102. As a result, the mobile device 102 can execute the process instance without being connected to the server computing device 106. Data generated or captured during off-line mode is stored on the mobile device 102 until the mobile device 102 is once again connected to the server computing device 106, and the data is then uploaded to the server computing device 106, either automatically or at the request of the server computing device 106 or the mobile device 102. In some embodiments, off-line interactions are with tags 103a-b, other mobile devices, or both.

The following paragraphs are example use cases employing the techniques described above.

Use Case 1—Social Check-In Example

Recently, as part of evolving social media technology, mobile devices and associated software have made it more popular to 'check-in' when visiting various retail and/or entertainment locations. The techniques described herein can be used as an interaction mechanism for customers to perform a check-in function. The techniques also enable the owner or entity (e.g., a corporation) associated with the location to interact more fully with customers by way of a workflow process designed to improve the relationship with customers.

For example, upon receiving tag data from a mobile device, the process engine 406 can determine whether the received data indicates a check-in request by analyzing the identity of the user and/or the mobile device in conjunction with the role of the tag and the previous history of the mobile device in reading tags. The process engine 406 can deliver additional content and services to the mobile device 102 during the user's visit to the retail environment. The process engine 406 can also provide alternative or different content depending on, for example, how frequently the mobile device checks in to the location. For example, the process engine 406 can provide content indicating an incentive (e.g., a coupon, a free item) to the user if he or she reads additional tags in the location, thereby encouraging the user to read more tags and increase the interaction between the user and the retail establishment.

Use Case 1—Audit/Survey Example

The techniques described herein can also be used in the context of environmental auditing and building surveys. In this context, highly specialized auditors and surveyors visit industrial and commercial sites to perform an audit of the environment and impact of the site on the environment. Traditionally, the surveyor visits and tours a facility to perform surveys. During the visit, the surveyor takes copious notes, photographs and possibly recordings based on observations. Later, back at the office, this data is transferred into a computer system and a report is prepared. The data is also used to assemble an on-line web based information repository for the client and then a written report is also produced.

Using the techniques described here, the auditor can be equipped with a mobile device (e.g., smartphone) that is capable of interacting with the system and reading tags. The auditor can also have a set of RFID/NFC tags. To perform the initial audit, the auditor can tour the location and, at key points during the tour, the auditor can place a tag in a particular location (e.g., by affixing it permanently or semi-permanently). The tags used by the auditor can be discrete and unobtrusive, yet designed to be affixed for long durations. The tags can also be tamper-proof such that the tags cannot be removed and replaced elsewhere.

The auditor can read the tag with his mobile device and upload relevant tag data to the system for incorporation into workflow processes. For example, the mobile device can read the tag using a standard protocol (e.g., NFC) and transmit the tag data to the process engine to initiate an instance of a workflow process. In some embodiments, the process manager can use the tag data to create or update generic workflow processes and store the tag data. The instantiated workflow process can be either predefined by an off-site audit manager (e.g., via a web management portal or interface) so that the process is tailored to the auditor's specific tasks, or the process can include standard audit tasks predefined as part of a normal audit. The process engine can provide the mobile device with instructions based on the workflow process selected.

The auditor follows the instructions on the screen, e.g., selects data items from drop-down menus, takes photographs or a short video, makes a voice comment about what the auditor has seen. Upon completion, the mobile device can save the tag data locally (e.g., in a storage mechanism on the mobile device) and also transmit the tag data to the server computing device. The process engine analyzes the received tag data and executes actions called for in the workflow process. The process engine then transmits content back to the mobile device, for example, a follow-up inquiry for the auditor to address such as further data collection, a confirmation, or a request for a future visit. In some embodiments, the steps are pre-defined on the server computing device, and the auditor simply completes the relevant questions.

When the auditor has finished, the server computing device stores the data associated with the auditor's visit in data storage. The server computing device further makes the data available for other members of the team to review, start work on a client report, and update the client information system.

An advantage of this approach is that when follow-ups, repeat audits and other visits are carried out, the tags are already in place and the follow-up work can be performed quickly and easily. Specific locations or tags can be targeted and others ignored for such follow-ups. This can all be handled in the office prior to the visit. The office based team can review the audit and schedule specific point related follow-ups, that can be stored and triggered during the next routine survey or be scheduled for a specific follow-up.

A strength of the networked server-based tag system described in this example is that a 'virtual link' is created between the location of the tag and the server-based system such that the dependency on the individual auditor is reduced. Therefore, follow-up visits can be carried out by different auditors, staff members, or another company's auditors if required—and the data collection is controlled at a detailed level. Over time, a matrix of tags and tag collections evolves at the site for the system to use in building a nuanced picture of the environmental state and how it has evolved. The automation eases the auditors work and frees the business from having to send the same auditor on repeat visits due to their history with a site because the networked server-based tag system allows the audit to be configured 'virtually' ahead of time and then performed by a different person. The data collected can then be used for more complex analysis and to provide data to other key business systems.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A system for developing workflow processes associated with data-encoded tags, the system comprising:
a server computing device configured to:

receive, from one or more mobile devices, tag data associated with each of a plurality of data-encoded tags;
generate a collection of tags to include each of the plurality of data-encoded tags;
define a plurality of workflow roles for each tag in the collection of tags, wherein each workflow role is defined to include characteristics associated with a context in which the corresponding tag is read, the context including attributes of a device that reads the tag;
sequence each tag in the collection of tags according to a selected workflow role defined for the tag;
define one or more transition actions to follow each tag in the collection of tags based upon the selected workflow role and one or more decisions to be made by the server computing device based upon the tag data associated with the tag;
link the sequence of tags and the transition actions together into a workflow process; and
store the workflow process in a data storage module.

2. The system of claim 1, wherein the plurality of data-encoded tags are distributed at different locations.

3. The system of claim 1, wherein the plurality of data-encoded tags include RFID tags, NFC tags, smart cards, 2D barcode tags, QR code tags, or any combination thereof.

4. The system of claim 1, wherein the data associated with each tag includes location of the tag, color of the tag, design of the tag, affixed position of the tag, points of interest in proximity to the tag, or any combination thereof.

5. The system of claim 1, wherein the one or more mobile devices records the data associated with each tag in the form of audio, still pictures, video, text, numbers, or any combination thereof.

6. The system of claim 1, wherein the server receives the tag data from the one or more devices as each tag is read.

7. The system of claim 1, wherein the server receives the tag data from the one or more devices using a batch process.

8. The system of claim 1, wherein generating a collection of tags comprises:
determining the identity of a collection of tags to be used; and
associating each of the plurality of data-encoded tags and corresponding tag data with the determined collection of tags.

9. The system of claim 8, wherein the identity of the collection of tags is determined via user input.

10. The system of claim 1, wherein the one or more mobile devices store the recorded tag data in a local data storage module before the server receives the recorded tag data.

11. The system of claim 1, the server further configured to receive, from the one or more mobile devices, user data associated with a user of the mobile device.

12. The system of claim 11, wherein the workflow process is developed using the user data.

13. A method for developing workflow processes associated with data-encoded tags, the method comprising:
receiving, by a server computing device from one or more mobile devices, tag data associated with each of a plurality of data-encoded tags;
generating, by the server computing device, a collection of tags to include each of the plurality of data-encoded tags;
defining, by the server computing device, a plurality of workflow roles for each tag in the collection of tags, wherein each workflow role is defined to include characteristics associated with a context in which the corresponding tag is read, the context including attributes of a device that reads the tag;
sequencing, by the server computing device, each tag in the collection of tags according to workflow role defined for the tag;
defining, by the server computing device, one or more transition actions to follow each tag in the collection of tags based upon the selected workflow role and one or more decisions to be made by the server computing device based upon the tag data associated with the tag;
linking, by the server computing device, the sequence of tags and the transition actions together into a workflow process; and
storing, by the server computing device, the workflow process in a data storage module.

14. The method of claim 13, wherein the plurality of data-encoded tags are distributed at different locations.

15. The method of claim 13, wherein the plurality of data-encoded tags include RFID tags, NFC tags, smart cards, 2D barcode tags, QR code tags, or any combination thereof.

16. The method of claim 13, wherein the data associated with each tag includes location of the tag, color of the tag, design of the tag, affixed position of the tag, points of interest in proximity to the tag, or any combination thereof.

17. The method of claim 13, wherein the one or more mobile devices records the data associated with each tag in the form of audio, still pictures, video, text, numbers, or any combination thereof.

18. The method of claim 13, wherein the server receives the tag data from the one or more devices as each tag is read.

19. The method of claim 13, wherein the server receives the tag data from the one or more devices using a batch process.

20. The method of claim 13, wherein generating a collection of tags comprises:
determining the identity of a collection of tags to be used; and
associating each of the plurality of data-encoded tags and corresponding tag data with the determined collection of tags.

21. The method of claim 20, wherein the identity of the collection of tags is determined via user input.

22. The method of claim 13, wherein the one or more mobile devices store the recorded tag data in a local data storage module before the server receives the recorded tag data.

23. The method of claim 13, the server further configured to receive, from the one or more mobile devices, user data associated with a user of the mobile device.

24. The system of claim 23, wherein the workflow process is developed using the user data.

25. A computer program product, tangibly embodied in a non-transitory computer readable storage medium, for developing workflow processes associated with data-encoded tags, the computer program product including instructions operable to cause a data processing apparatus to:
receive, from one or more mobile devices capable of reading data-encoded tags, tag data associated with each of a plurality of data-encoded tags;
generate a collection of tags to include each of the plurality of data-encoded tags;
define a plurality of workflow roles for each tag in the collection of tags, wherein each workflow role is defined to include characteristics associated with a context in which the corresponding tag is read, the context including attributes of a device that reads the tag;

sequence each tag in the collection of tags according to a selected workflow role defined for the tag;

define one or more transition actions to follow each tag in the collection of tags based upon the selected workflow role and one or more decisions to be made by the server computing device based upon the tag data associated with the tag;

link the sequence of tags and the transition actions together into a workflow process; and store the workflow process in a data storage module.

* * * * *